United States Patent [19]
Griffin et al.

[11] 3,895,681
[45] July 22, 1975

[54] LOAD INDICATING ASSEMBLY

[76] Inventors: Colin John Griffin; Kerry Charles Griffin, both of 158 Pinnacle Dr., Upper Ross, Townsville, Australia, 4810

[22] Filed: Nov. 4, 1973

[21] Appl. No.: 415,500

[30] Foreign Application Priority Data
    Mar. 16, 1972  Australia............ 53405/73

[52] U.S. Cl. .............. 177/141; 177/136; 177/208
[51] Int. Cl. ........................................... G01g 19/10
[58] Field of Search .......... 177/136, 141, 208, 209, 177/126; 73/406

[56]            References Cited
            UNITED STATES PATENTS
2,209,969   1/1942   Branick ............................ 177/208
3,200,897   8/1965   Gibbons ........................... 177/208
3,372,764   3/1968   Crotts .............................. 177/208
3,646,854   3/1972   Bradley ........................... 177/208
3,658,142   4/1972   Marshall et al. ................ 177/208
3,698,492   10/1972  Lejeune ........................... 177/208
3,724,571   4/1973   Thorn et al. .................... 177/208
3,752,245   8/1973   Johnson ........................... 177/208

*Primary Examiner*—Richard B. Wilkinson
*Assistant Examiner*—Vit W. Miska

[57]             ABSTRACT

A portable load indicating assembly usable to weigh a vehicle by gauging the weight supported by each ground wheel, the load indicating assembly having a resiliently deformable member positioned between a support base and a load platen and indicating means sensitive to the deformation of said resiliently deformable member caused by a load on said platen, the indicating means being calibrated to indicate the weight on said platen.

4 Claims, 3 Drawing Figures

LOAD INDICATING ASSEMBLY

This invention relates to a load indicating assembly and more particularly it relates to a portable load indicating assembly usable to weigh vehicles such as loaded trucks.

All trucks have a designed maximum load capacity, and for safety reasons the designed maximum should not be exceeded. Also, if this load is exceeded, the resultant overload causes undue wear on the truck which results in premature deterioration of the truck and the road upon which the truck travels. Also, in many areas it is illegal to overload a truck and in such areas if a driver is found guilty of such an act severe penalties may be imposed on the driver.

It is thus an object of this invention to provide a portable load indicating assembly which may be used to indicate the weight of a vehicle, and in particular the weight of a loaded truck. It is also an object of this invention to provide such an assembly which will be reliable and efficient in operation and of robust construction. Other objects and advantages of the invention will become apparent from the following description.

With the foregoing and other objects in view this invention resides broadly in a load indicating assembly usable for weighing vehicles and the like and comprising, a support base supporting a resiliently deformable member, a load platen arranged to engage said resiliently deformable member in such manner that a load placed on said load platen will cause deformation of said resiliently deformable member, and indicating means sensitive to such deformation and calibrated to indicate the weight of said load. Preferably the resiliently deformed member is a fluid filled resilient tube and the indicating device is in the form of a pressure gauge connected operatively to said resilient tube to indicate the pressure of the fluid therein. It is also preferred that the load platen is of such length that it is adapted to support thereon a set of dual wheels of a truck axle assembly, with the axis of said wheels substantially parallel to the longitudinal edges of said load platen to enable said load indicating assembly to indicate the weight of said dual wheels.

In order that the invention may be more readily understood and put into practical effect reference will now be made to the accompanying drawings which illustrate the preferred embodiment of the invention and wherein:

FIG. 1 is a perspective view of the preferred form of portable load indicating assembly usable for weighing vehicles and the like;

Figure 1:
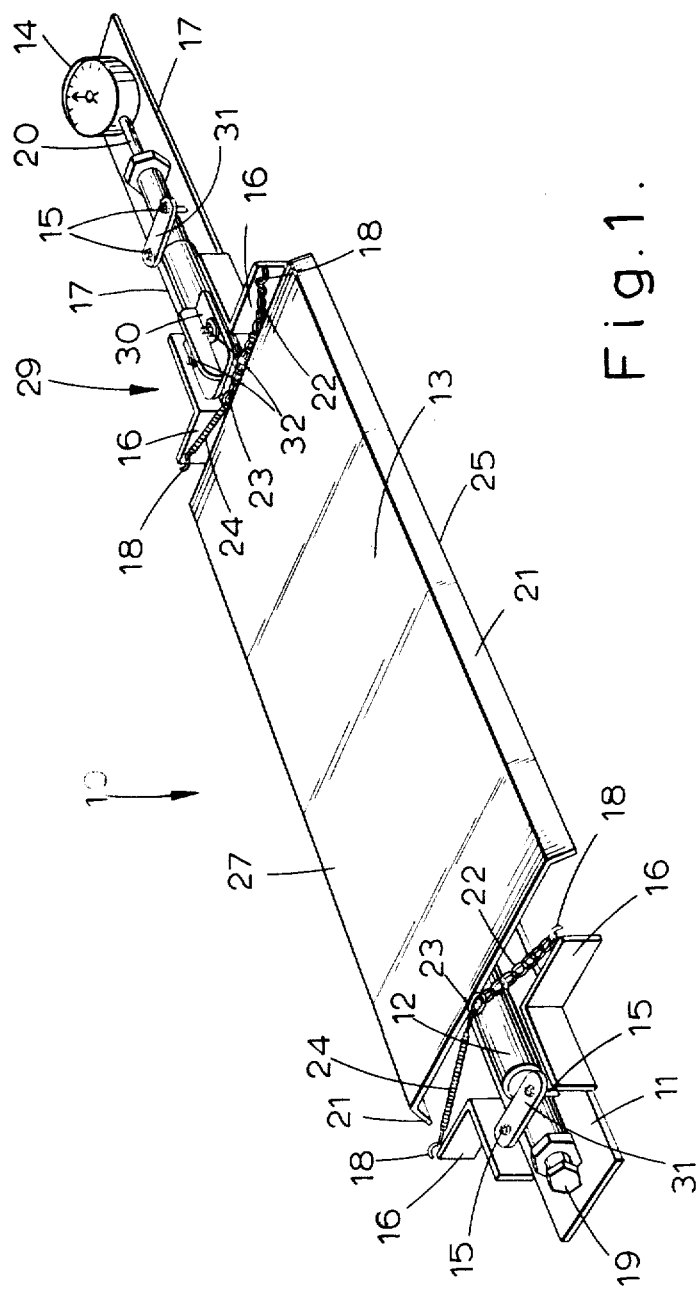
Figure 2:
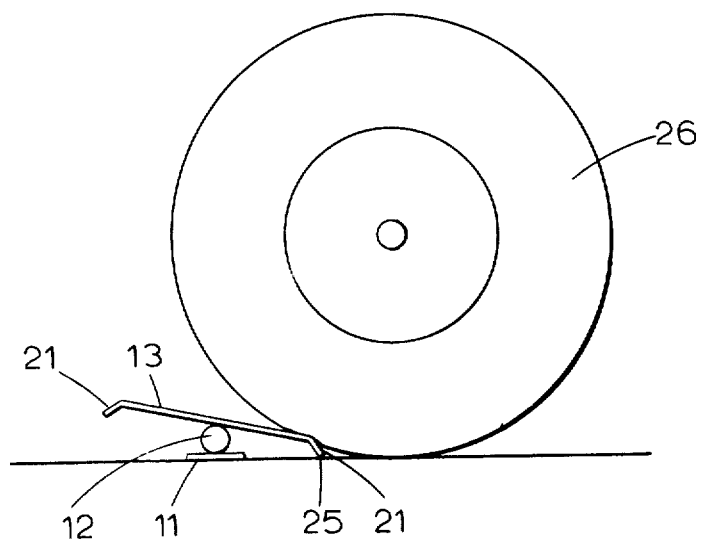
FIG. 2 is a diagrammatic illustration showing the load platen of the preferred embodiment tilted to enable a vehicle wheel to be driven on to the assembly.
Figure 3:
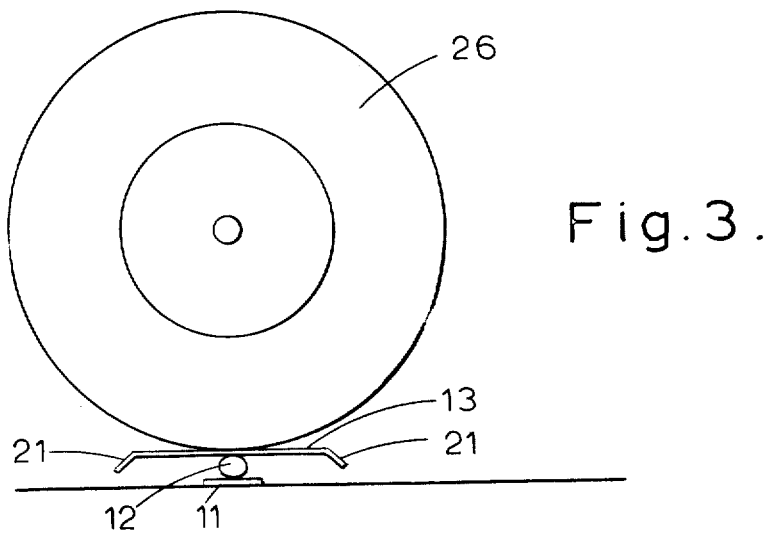
FIG. 3 is a further diagrammatic illustration showing the vehicle wheel supported operatively on the load platen.

Referring now to the drawings there is shown, a load indicating assembly 10 which in this embodiment comprises four basic components, namely a support base 11, a resiliently deformable member 12, a load platen 13 and indicating means in the form of a pressure gauge 14. As illustrated the support base 11 comprises an elongate rectangular plate measuring 4 feet long by 3 inches wide. This plate has affixed thereto, by welding, clamping studs 15 for securing the resilient member 12 to the support base 11 and a pair of opposed angle brackets 16 welded to the longitudinal side edges 17 of the support base 11 adjacent the ends of the load platen 13. Each angle bracket 16 is provided with a hook member 18 remote from the base 11 and the hooks are usable to connect the load platen 13 operatively to the support base 11.

As shown the resilient member or tube 12 is provided with a plugged connector 19 at one end and a connector 20 at the other end for connecting the pressure gauge 14 thereto. The connectors 19 and 20 are fixed sealably into the ends of the resilient tube 12 and are bolted to the base 11 by means of apertured plates 31 fixed to the studs 15. In this embodiment, the fluid filled resilient member 12 comprises a high pressure hose filled with water and having a circular cross-section. The hose 12 extends centrally along beneath the load platen 13 which can tilt thereabout.

The load platen 13 is fabricated from the mild steel plate and it is about 2 feet long by 1 foot wide. The longitudinal edges 21 thereof are turned downwards through an angle of 45° to the surface of the load platen 13. As illustrated, the load platen 13 is connected operatively to the support base 11 by means of a pair of chains 22 connected between the hook members 18 at one side of the support base 11 and a connecting member 23 positioned centrally at each end of the load platen 13. A spring 24 is connected between the opposite hook members 18 and the members 23 and this spring is arranged to maintain tension in the chains 22. Also the chains 22 are of such weight that in operation they tilt the load platen 13 in a preferred orientation, that is with the leading edge 25 in contact with the surface upon which the assembly is supported.

This ensures that the load platen 13 acts as a lead-up ramp to enable a wheel 26 to drive on to the assembly 10. Also after the vehicle has been weighed the weight of the vehicle as it drives off the load platen tilts the load platen about the tube 12 so that the trailing portion 27 of the load platen 13 provides an exit ramp from the assembly. Immediately after the vehicle has passed over the load indicating assembly the weight of the chains 22 will tilt the load platen 13 back to its preferred orientation wherein it acts as a lead-up ramp. The turned down longitudinal edges 21 are so formed that in operation as a vehicle wheel is driven on to said load platen the contact force between the wheel 26 and the load platen 13, due to the forward motion of the vehicle is transmitted through said turned down edge 21 of the surface upon which the assembly is supported. This prevents a high pressure increase in the resilient tube 12 due to the contact force resulting in a false reading of the weight of the vehicle.

As the vehicle wheel 26 moves to the central portion of the load platen 13 the resilient tube 12 is deformed an amount consistent with the weight of the vehicle and thus the load indicating assembly indicates only the true static weight supported by the vehicle wheel. It is apparent that if a vehicle is provided with four wheels then the all-up weight of the vehicle is obtained by weighing each wheel and adding the amount together.

In this embodiment the pressure gauge 14 is of the type having a full scale deflection of about 1600 p.s.i. and it is recalibrated to provide a full scale deflection of 5½ tons, the graduations being at one half ton intervals. It will also be apparent that the pressure gauge could also be arranged as a go or no-go gauge indicating only if the load was above or below a certain value and not indicating a specific weight.

The pressure gauge is also provided with an idler needle which remains at a maximum deflection and which can be reset after each use. Also, it is preferred that zero adjustment means be provided on the gauge. As well as this, zero adjustment means 29 are provided on the support base 11 and the means 29 in this embodiment comprise a reinforced plate 30 which extends across the tube 12 adjacent one end of the load platen 13. For this purpose the tube extends beyond the ends of the load platen as indicated in the drawings. The plate 30 is supported about upstanding bolts 32 which are welded to the support base 11, thus the gauge zero can be easily adjusted by tightening or by slackening-off the plate 30. For example the pressure in the tube can be increased by tightening the plate 30 or the pressure can be reduced by loosening the plate 30, thus zero of the pressure gauge can be set accurately. It is also preferred that mechanical protection means be provided on the pressure gauge to prevent damage thereto due to misuse or the like.

In operation, it is preferred that two such load indicating assemblies be used, one at each side. Normally the load indicating assemblies are placed under the front wheels of the truck and the truck is driven slowly over the assemblies so that the maximum deflections of the pressure gauges are recorded by the idler needles. As described previously, the lead-up ramp will under the influence of the chains tilt back to its preferred orientation prior to being driven over by back wheels of the truck. The readings of the maximum loads indicated by the idler pointers are noted and then reset to zero and the back wheels are then driven slowly over the assembly and the weights of the back wheels are noted. The total weight of the vehicle is then found by adding the individual weights of each wheel assembly. After use the load platen 13 can be easily removed from the assembly 10 by unhooking the springs 24 and the chains 22. The assembly can then be placed in the truck where it will be ready for use when the truck is next loaded.

It will thus be found that the preferred embodiment as described above will be very useful as a portable lead indicating assembly particularly for weighing vehicles. Also, the weighing apparatus described in this invention could be incorporated into a fixed installation and wherein the pressure gauge would be remotely wall mounted or arranged to actual lights, the colour indicating the approximate load.

While the above has been given by way of illustrative example, it will of course be realised that many modifications of constructional detail and design may be made to the above described embodiments by persons skilled in the art without departing from the broad scope and ambit of the invention as is defined by the appended claims.

We claim:

1. A load indicating assembly usable for weighing vehicles and the like and comprising, a support base supporting a resiliently deformable member, a load platen arranged to engage said resiliently deformable member in such manner that a load placed on said load platen will cause deformation of said resiliently deformable member, and indicating means sensitive to such deformation and calibrated to indicate the weight of said load, said resiliently deformable member being a sealed fluid filled resilient tube, said indicating means comprising a pressure gauge connected operatively to said resilient tube to indicate the pressure of the fluid therein, said load platen comprising a substantially flat, horizontally inclined rectangular plate, the latter being supported on said sealed fluid filled resilient tube, said rectangular load platen being elongate and of such length that it is adapted to support thereon a set of dual wheels of a truck axle assembly, with the axis of said wheels substantially parallel to the longitudinal edges of said load platen to enable said load indicating assembly to be used to indicate the weight of said dual wheels, said resilient tube extending along the underside of said load platen and beyond the ends thereof with its axis disposed centrally beneath the longitudinal center line of said load platen, said platen being tiltable about said tube to form, in operation, an approach ramp and an exit ramp to and from the central portion of said platen, said longitudinal edges of said elongate rectangular platen being turned downwards so that in operation, as a vehicle wheel is driven onto said load platen the latter tilts to form an approach ramp and the down-turned edge contacts the surface upon which the assembly is supported in such manner that the contact force between said wheel and said platen, due to the forward motion of said vehicle wheel is transmitted directly to said supporting surface through said downwardly-turned edge, by contact therebetween, and as said wheels move across the load platen, the latter rocks about said elongate tube until the said down-turned edge is moved clear of the support base so that the load indicating assembly indicates only the true static weight of said vehicle wheel, said support base being a flat, elongate, rectangular metal plate and said fluid filled resilient tube extending centrally therealong, said assembly being of such size as to be portable, said fluid filled tube being clamped to said base adjacent the ends of said load platen, the latter being arranged to be maintained in its operative position supported on said fluid filled tube by a pair of chains connected between the ends of said platen and said base and a pair of springs opposing said chains to maintain tension therein.

2. A load indicating assembly according to claim 1, wherein said pressure gauge is mounted rigidly on said support base.

3. A load indicating assembly according to claim 1, wherein said pressure gauge is mounted remote from said support base.

4. A load indicating assembly according to claim 1, wherein means are provided to automatically tilt said load platen to a preferred orientation, wherein said load platen forms the lead-up ramp.

* * * * *